(12) United States Patent
Zivkovic et al.

(10) Patent No.: US 11,209,322 B2
(45) Date of Patent: Dec. 28, 2021

(54) INTEGRATED TEMPERATURE SENSOR, METHOD FOR PRODUCING AN INTEGRATED TEMPERATURE SENSOR AND METHOD FOR DETERMINING A TEMPERATURE BY MEANS OF AN INTEGRATED TEMPERATURE SENSOR

(71) Applicant: ams International AG, Rapperswil (CH)

(72) Inventors: Zoran Zivkovic, Hertogenbosch (NL); Casper Van Der Avoort, GB Waalre (NL); Willem Frederik Adrianus Besling, BA Eindhoven (NL)

(73) Assignee: AMS INTERNATIONAL AG, Rapperswil (CH)

( * ) Notice: Subject to any disclaimer, the term of this patent is extended or adjusted under 35 U.S.C. 154(b) by 238 days.

(21) Appl. No.: 16/329,295

(22) PCT Filed: Aug. 7, 2017

(86) PCT No.: PCT/EP2017/069940
§ 371 (c)(1),
(2) Date: Feb. 28, 2019

(87) PCT Pub. No.: WO2018/054596
PCT Pub. Date: Mar. 29, 2018

(65) Prior Publication Data
US 2019/0226921 A1 Jul. 25, 2019

(30) Foreign Application Priority Data
Sep. 21, 2016 (EP) ..................... 16189956

(51) Int. Cl.
*G01K 11/24* (2006.01)
(52) U.S. Cl.
CPC ................... *G01K 11/24* (2013.01)

(58) Field of Classification Search
None
See application file for complete search history.

(56) References Cited

U.S. PATENT DOCUMENTS 5,360,268 A 11/1994 Hayashi et al.
5,624,188 A 4/1997 West
(Continued)

FOREIGN PATENT DOCUMENTS

CN 1648653 A 8/2007
CN 102362178 A 2/2012
(Continued)

OTHER PUBLICATIONS

European Patent Office, International Search for PCT/EP2017/069940 dated Sep. 13, 2019.

*Primary Examiner* — Erica S Lin
(74) *Attorney, Agent, or Firm* — MH2 Technology Law Group LLP

(57) ABSTRACT

An integrated temperature sensor comprises a chip package enclosing an integrated circuit and an ultrasonic transceiver which is integrated on top of the integrated circuit. The ultrasonic transceiver comprises a transmitting element which is arranged for emitting ultrasound waves, and a receiving element which is arranged for receiving ultrasound waves. The chip package comprises at least one barrier arranged at a defined position in the chip package. The barrier is designed to at least partly reflect ultrasound waves emitted by the transmitting element towards the receiving element. The integrated circuit comprises an actuator element to actuate the transmitting element to emit ultrasound waves according to a first signal s(t), and a converter element to convert an ultrasound wave, received by the receiving element, into a second signal y(t). Furthermore, a method for producing an integrated temperature sensor and (Continued)

a method for determining a temperature by means of an integrated temperature sensor are presented.

20 Claims, 9 Drawing Sheets

(56) References Cited

U.S. PATENT DOCUMENTS

| | | | | |
|---|---|---|---|---|
| 2009/0268553 A1* | 10/2009 | Ecker | ................... | G01S 7/5273 |
| | | | | 367/119 |
| 2011/0314897 A1 | 12/2011 | Schellekens et al. | | |
| 2012/0035464 A1* | 2/2012 | Raju | ........................ | A61N 7/02 |
| | | | | 600/411 |
| 2012/0212904 A1* | 8/2012 | Fleming | ............... | H05K 1/0259 |
| | | | | 361/679.56 |
| 2014/0371592 A1* | 12/2014 | Yamamoto | ............... | A61B 8/54 |
| | | | | 600/443 |

FOREIGN PATENT DOCUMENTS

| | | |
|---|---|---|
| CN | 203825032 U | 9/2014 |
| CN | 104764803 A | 7/2015 |
| CN | 205317368 U | 6/2016 |

\* cited by examiner

INTEGRATED TEMPERATURE SENSOR, METHOD FOR PRODUCING AN INTEGRATED TEMPERATURE SENSOR AND METHOD FOR DETERMINING A TEMPERATURE BY MEANS OF AN INTEGRATED TEMPERATURE SENSOR

This invention relates to an integrated temperature sensor, to a method for producing an integrated temperature sensor and to a method for determining a temperature by means of an integrated temperature sensor.

BACKGROUND OF THE INVENTION

Temperature sensors find increasing application in mobile devices. For example, such sensors are integrated into mobile phones with the purpose to measure the ambient temperature outside the device. However, the raw sensor reading often does not give correct ambient temperature. The sensor is typically based on an integrated circuit having a number of integrated transistors and/or diodes embedded in a silicon die which reside inside a chip package. The integrated circuit is firmly mounted on a printed circuit board (PCB), and together with a plurality of other components, housed inside the phone's case. The whole system therefore has a large thermal time constant, which may be in the range of about half an hour or more. Moreover, many dynamically changing heat sources, e.g. active components such as microprocessors, are present inside a phone case and significantly elevate the temperature at the location of the temperature sensor with respect to the true ambient temperature. Inaccurate and slow temperature measurement of the ambient makes also other ambient gas measurement slow and inaccurate.

The speed of sound in an object (e.g. gas, liquid, solid) depends on temperature, and, thus, ultrasound is often used to measure air temperature. Ultrasound is preferred over audible sound as it does not distract users, ultrasound measurements are fast and measure temperature directly without the need to contact or having a sensor body in thermal equilibrium. However, such systems are bulky and typically built with regular microphones and speakers. Thus, these sensors cannot be integrated into mobile devices. Furthermore, for accurate timing measurements, the microphone and speaker in a temperature measurement setup need accurate synchronization which is often difficult to achieve. An air temperature measurement by ultrasound will typically be influenced by relative humidity and absolute pressure of the ambient. Thus, in order to gain a more accurate temperature from a speed of sound measurement, humidity and pressure sensors need to be supplied. This further increases the requirements on space, complexity and synchronization.

SUMMARY OF THE INVENTION

It is to be understood that any feature described in relation to any one embodiment may be used alone, or in combination with other features described, and may also be used in combination with one or more features of any other of the embodiments, or any combination of any other of the embodiments unless described as an alternative. Furthermore, equivalents and modifications not described below may also be employed without departing from the scope of the integrated temperature sensor, method for producing an integrated temperature sensor and method for determining a temperature by means of an integrated temperature sensor which are defined in the accompanying claims.

In at least one embodiment an integrated temperature sensor comprises a chip package, an integrated circuit, and an ultrasonic transceiver. The ultrasonic transceiver is integrated on top of the integrated circuit and comprises a transmitting element and a receiving element. The transmitting element is arranged for emitting ultrasound waves and the receiving element is arranged for receiving ultrasound waves. Basically, it is possible to arrange the integrated temperature sensor for other wave forms such as audible sound waves as well. In order not to distract a person, however, ultrasound is preferred over audible. Ultrasound waves, considered hereinafter, are ranging from 10 kHz up to several GHz, for example.

The chip package encloses the ultrasonic transceiver and the integrated circuit. Furthermore, the chip package comprises at least one barrier which is arranged at a defined position in the chip package. The barrier is designed to at least partly reflect ultrasound waves. The barrier at the defined position is also arranged or aligned to, at least partly, reflect ultrasound waves emitted by the transmitting element towards the receiving element. By placing the barrier at the defined position a path length is defined, i.e. a path of path length L connects the transmitting element with the receiving element via the barrier. Several barriers may be located at different defined positions and thus defining a path with path length connecting the transmitting element with the receiving element via several reflections at the individual barriers.

The integrated circuit comprises several means to operate the integrated temperature sensor. First, the integrated circuit comprises an actuator element to actuate the transmitting element to emit ultrasound waves according to a first signal s(t). Second, the integrated circuit comprises a converter element to convert an ultrasound wave received by the receiving element into a second signal y(t). Third, the integrated circuit also comprises a detector to determine a time or phase delay from the emitted first signal s(t) and the received second signal y(t), e.g. induced by travelling along the path that connects the transmitting element with the receiving element via the barrier. In other words, the integrated circuit can be considered a read-out and pre-processing circuit.

During operation, the transmitting element emits ultrasound waves towards the one or more barriers according to the first signal. Ultrasound waves are reflected from the barriers and are received by the receiving element. The receiving element converts the received ultrasound wave into a sensor signal, i.e. second signal. The path length(s) is defined by the position of the barrier or barriers at the defined positions in the chip package. The detector to determine a time or phase delay are arranged to determine a time or phase delay of the ultrasound waves travelling the path length.

As path length and the frequency of emitted and received ultrasound waves are known, a speed of sound within the chip package can be determined. In general, the integrated temperature sensor, and e.g. the integrated circuit, may provide all necessary means or components to determine the time delay (or phase delay), speed of sound and/or temperature on board. For example, the integrated circuit comprises a computation unit, such as a microcontroller or signal processor, to perform the necessary computation steps. However, the integrated temperature sensor could also only provide for a pre-processing and provide the first and second signals to an external computation unit, such as a PC or processor in a mobile phone.

The proposed integrated temperature sensor employs ultrasound for temperature measurement and can completely be integrated on top of the integrated circuit, such as a CMOS die. On the same die, integrated additional sensors, e.g. for relative humidity and pressure, can be constructed. As such, an all-in-one miniature sensor for absolute ambient temperature can be constructed.

In at least one embodiment the detector to determine a time or phase delay comprises a frequency detector and/or a phase meter. The frequency detector and/or phase meter are coupled to the receiving element. For example, the frequency detector and phase meter are arranged to compare the frequency or phase of the first and second signals. For example, the devices have two inputs which input the first and second signals. A difference signal is generated as a measure of the time or phase delay. For example, a time of emission $t_1$ and a time of receiving $t_2$ can be determined and the time delay $\Delta t$ can simply be calculated as $\Delta t = t_2 - t_1$.

In at least one embodiment the actuator element to actuate the transmitting element comprise a signal source and a power amplifier. The signal source is arranged for generating the first signal s(t). For example, the signal source is a local oscillator. The power amplifier is connected to the signal source and to the transmitting element. The power amplifier is arranged for actuating the transmitting element to emit the first signal s(t). For example, the power amplifier amplifies the first signal generated by the signal source such that the transmitting element is oscillating according to the first signal.

In at least one embodiment the converter element to convert an ultrasound wave comprise a preamplifier and/or a gain controlled amplifier coupled to the receiving element. The preamplifier or gain controlled amplifier amplify the detected second signal y(t) to improve pre-processing of the signal.

In at least one embodiment the transmitting element and/or the receiving element are designed as membranes. For example, the membranes can be designed using MEMS technology.

In at least one embodiment the transmitting element and the receiving element are designed as a single transmitting/receiving membrane, i.e. the same membrane serves as both transmitting and receiving element. Alternatively, the transmitting element and the receiving element are designed as separate, i.e. dual transmitting, receiving membranes.

In at least one embodiment the transmitting element and receiving element are arranged in the ultrasonic transceiver at a distance of approximately $\lambda_{max}$ from each other. The distance $\lambda_{max}$ corresponds to a maximum speed of sound $c_{max}$ at a given ultrasound frequency f and follows from the wave relationship. Alternatively, or additionally, the transmitting element and receiving element have a length or diameter equal or close to the maximum sound wavelength $\lambda_{max}$. Arranging the transmitting and/or receiving element in view of the maximum sound wavelength increases efficiency of transmission and reception of the ultrasound waves.

In at least one embodiment the chip package comprises one of: a Land Grid Array, a Pin Grid Array, a Chip Scale Package and/or a 3D Wafer Level Chip Scale Package.

In at least one embodiment the at least one barrier is arranged inside the chip package, i.e. constitutes an element which is separate from the chip package but arranged or even connected to the chip package. Alternatively, or in addition, one or more barriers are integral parts of the chip package. For example, one or more walls or surfaces of the chip package can be used as sound reflecting barriers.

In at least one embodiment the one or more barriers define the path length L. The path length corresponds to the path connecting the transmitting element and the receiving element by way of reflection via the one or more barriers. Furthermore, the path length is arranged to depend on the maximum sound wavelength $\lambda_{max}$, e.g. as a fraction and/or a multiple of the maximum sound wavelength $\lambda_{max}$.

Arranging the path length in view of the maximum sound wavelength results in rather small dimensions of the chip package. This allows for transceiving continuous, single frequency ultrasound waves without phase wrap in a large temperature range. In fact, emitting ultrasound waves at a single frequency is often a simpler solution as the ultrasound waves can be adjusted for the particular single frequency and a dedicated actuating circuit can be integrated into the integrated circuit.

In at least one embodiment the frequency f of the emitted ultrasound waves and the path length L are arranged to meet a boundary condition:

$$\frac{L}{\lambda_{max}} \cdot \frac{c_{max} - c_{min}}{c_{min}} < 1.$$

The term $c_{min}$ denotes a minimum and $c_{max}$ a maximum speed of sound. These speed of sound terms correspond to a lowest temperature $T_{min}$ and a highest temperature $T_{max}$ to be measured, respectively. This temperature range can be defined by the system dimensions, e.g. by setting an appropriate path length by positioning the barrier at the defined positions in the chip package. In case of single frequency ultrasound waves the boundary condition assures that a measured phase delay within the given temperature range stays within the boundaries of 0 to $2\pi$.

At least one embodiment the at least one barrier is located at a distance equal or close to the maximum sound wavelength $\lambda_{max}$ with respect to at least one surface of the chip package. The term "close" is determined by the measurement accuracy, e.g. 1% to 10%.

In at least one embodiment the chip package encloses a cavity. The cavity can either be closed or open to ambient.

In at least one embodiment the integrated circuit further comprises one or more additional components including a relative humidity sensor, a pressure sensor, and/or an auxiliary temperature sensor, integrated into the same integrated circuit. Typically, the speed of sound also depends on the relative humidity and ambient pressure so that providing for respective sensors can increase accuracy of the measurement. For example, one or more membranes of the integrated temperature sensor can be reused as a pressure sensor. Furthermore, the auxiliary temperature sensor can be used to extend the temperature range of the integrated temperature sensor.

In at least one embodiment a method for producing an integrated temperature sensor comprises the following steps. An integrated circuit is provided and has an actuator element to actuate a transmitting element to emit ultrasound waves according to a first signal s(t). Furthermore, the integrated circuit has a converter element to convert an ultrasound wave, received by a receiving element, into a second signal y(t). An ultrasonic transceiver is integrated on top of the integrated circuit. The ultrasonic transceiver comprises the transmitting element and the receiving element.

The chip package is formed so as to at least partly enclose the integrated circuit and the ultrasonic transceiver. In the chip package at least one barrier is arranged at a defined position. The barrier is designed to at least partly reflect ultrasound waves emitted by the transmitting element towards the receiving element.

In at least one embodiment one or more integrated temperature sensors are produced on a wafer. The wafer is provided and has a plurality of integrated circuits and a plurality of ultrasonic transceivers, respectively. A glue layer is deposited on the wafer and on top of the integrated circuits and ultrasonic transceivers. Then the glue layer is patterned by providing grooves into the glue layer.

A prefabricated cap wafer is positioned over the wafer. The cap wafer comprises a plurality of pre-etched holes. By positioning the cap wafer over the wafer the holes are aligned with respect to the ultrasonic transceivers, i.e. the ultrasonic transceivers fit into the holes when the cap wafer is glued to the wafer. The holes leave a volume such that a plurality of cavities is formed. Then the cap wafer is glued or laminated to the glue layer to form the chip package.

A back grinding layer is arranged over a backside of the wafer. One or more through substrate vias are etched into the grinding layer, and are then isolated and metallized. Electrical connectivity is provided to each of the integrated circuits by applying a redistribution layer on the grinding layer. One or more bumps are arranged on the redistribution layer and connected to the through substrate vias through the redistribution layer. Finally, the wafer and glued cap wafer are singulated into individual integrated temperature sensors.

In at least one embodiment a method for determining a temperature by means of an integrated temperature sensor comprises the following steps. For example, the integrated temperature sensor comprises a chip package enclosing an integrated circuit and an ultrasonic transceiver integrated on top of the integrated circuit. In fact, the integrated temperature sensor may have one or more of the features presented above.

An ultrasound wave is emitted by means of the ultrasonic transceiver towards at least one barrier which is arranged at a defined position in the chip package. The ultrasound wave depends on a first signal $s(t)$. The ultrasound wave is reflected at one or more of the barrier is arranged in the chip package and received by means of the ultrasonic transceiver. The received ultrasound wave is converted into a second signal $y(t)$.

A time delay is determined from the first signal $s(t)$ and the second signal $y(t)$. The time delay is due to the finite time necessary for the ultrasound wave to travel from a transmitting element to the receiving element of the ultrasonic transceiver by way of the one or more barriers. The time delay provides a measure to determine the speed of sound in the chip package. Finally, a temperature is determined from the determined speed of sound.

In at least one embodiment the integrated temperature sensor is operated in a continuous operation mode. In the continuous operation mode the ultrasonic transceiver continuously emits ultrasound waves within the time period at a single frequency f. Alternatively, the integrated temperature sensor is operated in a pulsed operation mode. Then, the ultrasonic transceiver emits ultrasound waves as a pulsed and/or a train of consecutive pulses.

In at least one embodiment the time delay of received ultrasound waves is measured as the phase delay in the signal phase space. The frequency f of ultrasound waves and a path length L are arranged to meet the following boundary condition:

$$\frac{L}{\lambda_{max}} \cdot \frac{c_{max} - c_{min}}{c_{min}} < 1.$$

The term $c_{min}$ denotes a minimum and $c_{max}$ denotes a maximum speed of sound, respectively. These terms correspond to a lowest temperature $T_{min}$ and a highest temperature $T_{max}$ to be measured, respectively. The term $\lambda_{max}$ denotes the wavelength that follows from the wave relationship $\lambda_{max} = c_{max}/f$ corresponding to the maximum sound speed $c_{max}$.

In at least one embodiment the method for determining a temperature by means of an integrated temperature sensor comprises further steps. An auxiliary temperature $T_{aux}$ is determined from an auxiliary temperature sensor. The auxiliary temperature sensor is integrated in the integrated circuit. The term ±T denotes an accuracy of the auxiliary temperature sensor. A temperature reading $T_{aux}$ from the auxiliary temperature sensor is used to correct the determined time delay from the speed of sound measurement, given by $\Delta\theta_{phase}$, and the determined temperature $T_{phase}$. The correction involves incrementing the temperature reading $T_{phase}$ by 2·T increments such that the following inequality holds:

$$(T_{phase}+2 \cdot n \cdot T)-T < T_{aux} < (T_{phase}+2 \cdot n \cdot T)+T,$$

where n is an integer number chosen to fulfil the above inequality.

The integrated temperature sensor constitutes a miniaturized speed of sound measurement device for deriving the ambient gas or air temperature. The construction can be based on a design where ultrasound transmitter and receiver are placed next to each other and a barrier is placed in front to reflect the ultrasound signal. The dimensions of the sensor allow for implementing a single frequency measurement principle due to the construction of the device. However, a single membrane embodiment can be realized and membrane optimization for pulsed operation of the device. The temperature sensor can be combined with an integrated relative humidity sensor to remove humidity effect on the measurement on or in the same integrated circuit. A closed cavity construction, where a controlled gas mixture is in the cavity, can make the temperature measurement largely independent of other external influences. The combination with an internal auxiliary temperature sensor allows for better accuracy over an enlarged temperature range without the need of an additional calibration. Additionally, the temperature sensor can be combined with a pressure sensor integrated on or in the same integrated circuit, e.g. membranes can be reused to sense pressure as well.

In the following, the principle presented above is described in further detail with respect to drawings, in which exemplary embodiments are presented.

In the exemplary embodiments and Figures, similar or identical elements may each be provided with the same reference numerals. The elements illustrated in the drawings and their size relationships among one another, however, should not be regarded as true to scale, rather individual elements, such as layers, components, and regions, may be exaggerated to enable better illustration or a better understanding.

DETAILED DESCRIPTION

Figure 1A:
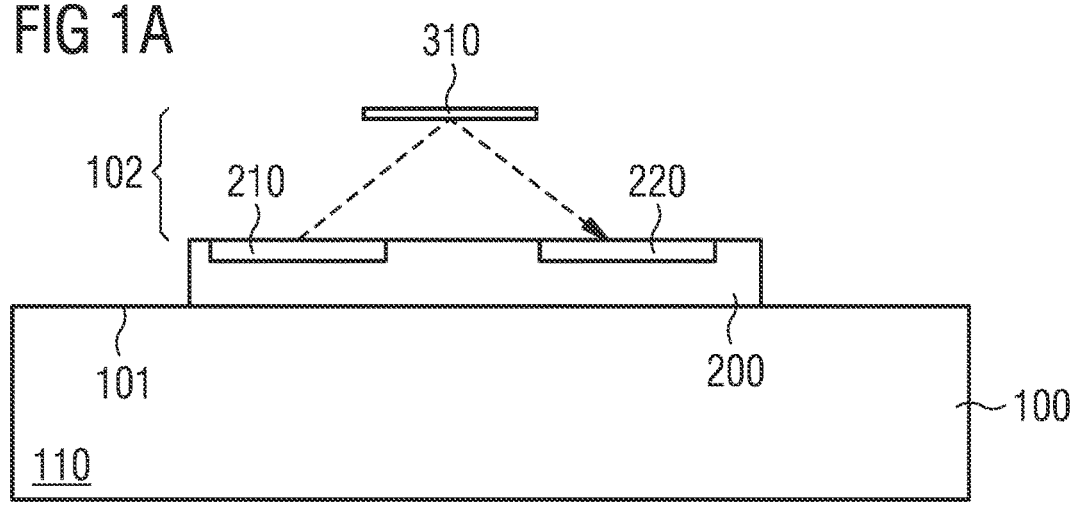
FIGS. 1A to 1E show exemplary embodiments of integrated temperature sensors.

FIGS. 1A to 1E show exemplary embodiments of integrated temperature sensors. The integrated temperature sensors each comprise an integrated circuit 100 and an ultrasonic transceiver 200 integrated on top of the integrated circuit 100. All integrated temperature sensors discussed hereinafter comprise a chip package 300. In the drawings, however, the chip package 300 may not be shown in its entirety for reasons of easier representation.

The ultrasonic transceiver 200 comprises a transmitting element 210 and a receiving element 220. In the embodiments discussed here, the ultrasound transmitting element 210 and the receiver element 220 are embodied as a transmitting membrane and a receiving membrane on top of a CMOS integrated circuit, respectively. The membranes may have different geometries, such as a square, rectangular or circular profile, e.g. implemented by MEMS technology.

The integrated circuit 100 comprises a semiconductor substrate 110, such as a Si, SiGe, silicon on insulator (SOI), GaAs, or GaN heterojunction substrate, etc., and constitutes a basis for integrating the ultrasonic transceiver 200. Furthermore, the integrated circuit 110 carries a plurality of circuit elements such as means to operate or control the transceiver 200, i.e. the integrated circuit 100 can be considered a read-out and pre-processing circuit for the transceiver 200. For example, the integrated circuit 100 has an actuator element to actuate 120 the transmitting element 210 to emit ultrasound waves according to a first signal s(t) (see FIG. 2 for more details).

Figure 2:
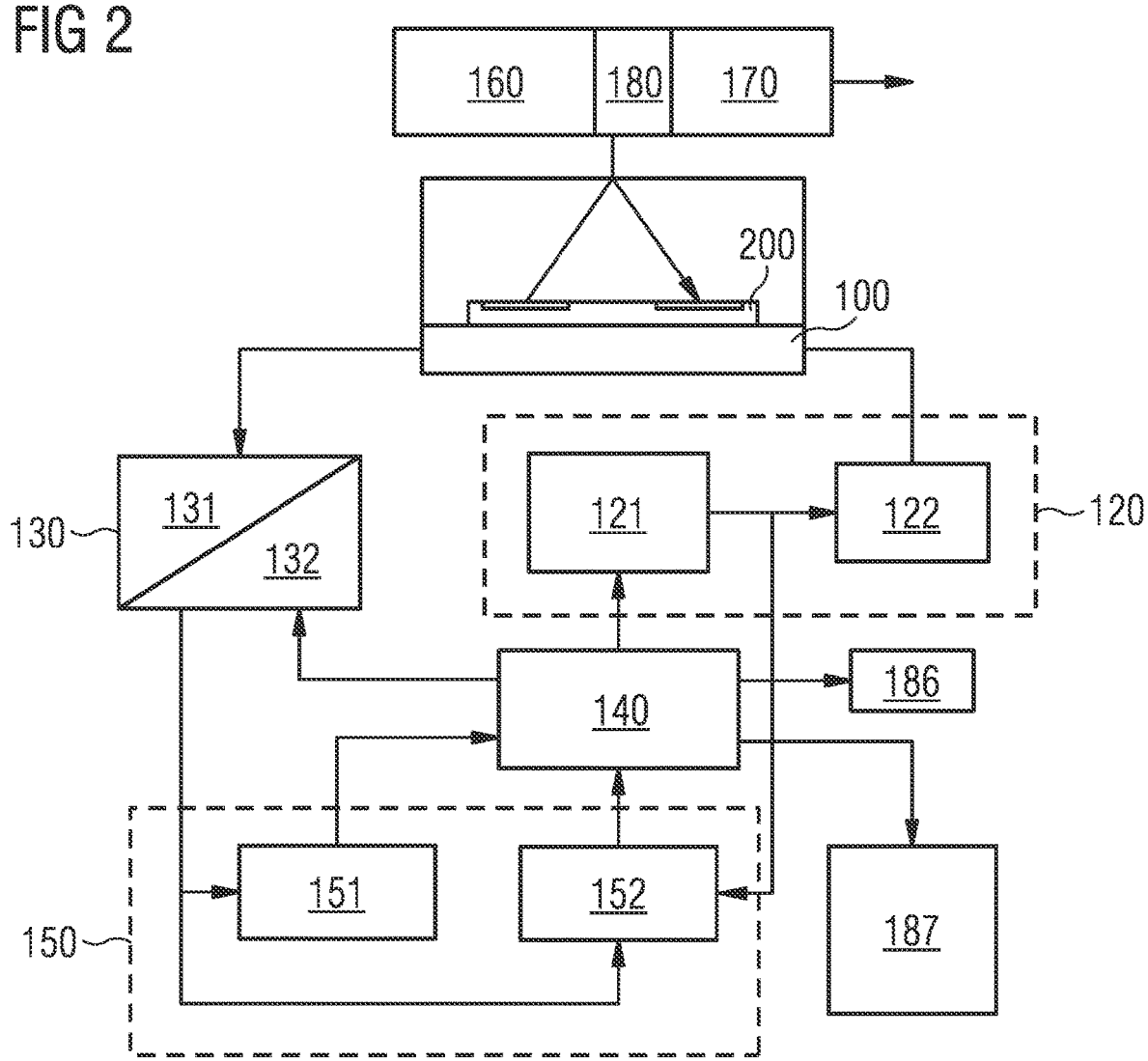
FIG. 2 shows an exemplary embodiment of an integrated circuit.

Furthermore, the integrated circuit 100 has means 130 to convert an ultrasound wave, received by the receiving element 220, into a second signal y(t) (see FIG. 2 for more details). Processing of these signals will be discussed in further detail below and allows for determining a temperature.

For a more efficient use, a diameter or length of the membranes can be arranged close to a maximum sound wavelength $\lambda_{max}$. The maximum sound wavelength $\lambda_{max}$ follows from the wave relationship $\lambda_{max}=c_{max}/f$ corresponding to a maximum speed of sound $c_{max}$ given an ultrasound frequency f. The membranes can be also placed at a distance of approximately $\lambda_{max}$ from each other, e.g. along a lateral direction parallel to a main surface 101 of the integrated circuit 100.

The chip package 300 comprises at least one barrier 310 arranged at a defined position with respect to the chip package 300 and/or the ultrasonic transceiver 200. One or more barriers 310 are designed into the chip package 300 and are arranged to at least partly reflect ultrasound waves. For example, an ultrasound wave emitted by the transmitting element 210 is, at least in parts, reflected towards the receiving element 220. The barrier, or barriers 310, define a predetermined path length L, which corresponds to the path connecting the transmitting element 210 and the receiving element 220 by way of reflection via the one or more barriers 310. The chip package 300 can be implemented in different ways, including a Land Grid Array (LGA), a Pin Grid Array (PGA), a Chip Scale Package (CSP) etc. Further examples will be discussed below.

FIGS. 1A to 1E show different embodiments of barriers. Basically, barriers 310 can be arranged inside the chip package 300 and/or be an integral part of the chip package 300. In either case, the one or more barriers 310 define the path length L and are arranged with respect to each other so that an ultrasound wave emitted by the transmitting element 210 eventually reaches the receiving element 220 by means of successive reflection at the barrier 310 or successive reflections at the barriers 310.

FIG. 1A shows a first embodiment having a single barrier. The barrier 310 is arranged in a plane above a main surface 101 of the integrated circuit 100 at a distance 102. In top view the barrier 310 is arranged between the transmitting and receiving element 210, 220 (or membranes). For example, the barrier 310 has a main surface 311 that is arranged parallel with the main surface 101 of the integrated circuit 100. In this case the barrier 310 is positioned in-between the transmitting and receiving element 210, 220 (or membranes) if viewed from above. The barrier 310 may be implemented as a wall 312 of the chip package 300.

The distance 102 of the barrier 310 to the membranes, or the plane in which are positioned, e.g. a main surface 101 of the integrated circuit 100, can be chosen at $3 \cdot \lambda_{max}/2$. This supports unambiguous detection for the temperature in the range −20° C. to 70° C., for example (see FIG. 6 for further details). For an ultrasound frequency of f=800 kHz, $\lambda_{max}$ equals approx. 0.4 mm, to give an illustration of possible dimensions. It can be shown that resonance frequencies of proposed integrated temperature sensors are in this range as well.

The schematic layout shown in FIG. 1A has been explored experimentally by using an ultrasound concept for detecting close-by objects (send and receive) with square membranes. The presence of a reflective barrier placed about 1 to 2 cm over the membranes could be detected with a pulse echo technique. It has been found that due to the rather high resonance frequency defined by the chip package 300, the attenuation is rather large. This limits the use of large path lengths L. However, the proposed integrated temperature sensor allows for creating a comparatively small cavity package in which the speed of sound is being measured. So using a high frequency typically is not an issue from a perspective of signal loss due to absorption, since already for much larger distance of 1 to 2 cm it is possible to detect reflected ultrasound waves.

Additional considerations may involve the thermal behaviour of the materials used for the integrated temperature sensor. The path length L, i.e. the distance between the barrier 310 and the transmitting/receiving elements 210, 220, can change due to thermal effects. Such effects should be limited not to cancel the speed changes that are to be measured. So the effect on the path length L should preferably be much less than the effect on the speed of sound.

It has been found that the effect on the speed of sound is approximately 0.1% per 1° C. of temperature change. Thus, the choice of material should be such that the path length L changes either much less, e.g. 0.001%, or in a different direction. Elongation or strain based on temperature changes is measured in ppm (is 0.0001%) for most materials. For Si this is 2.6 ppm/° C.

Figure 1B:
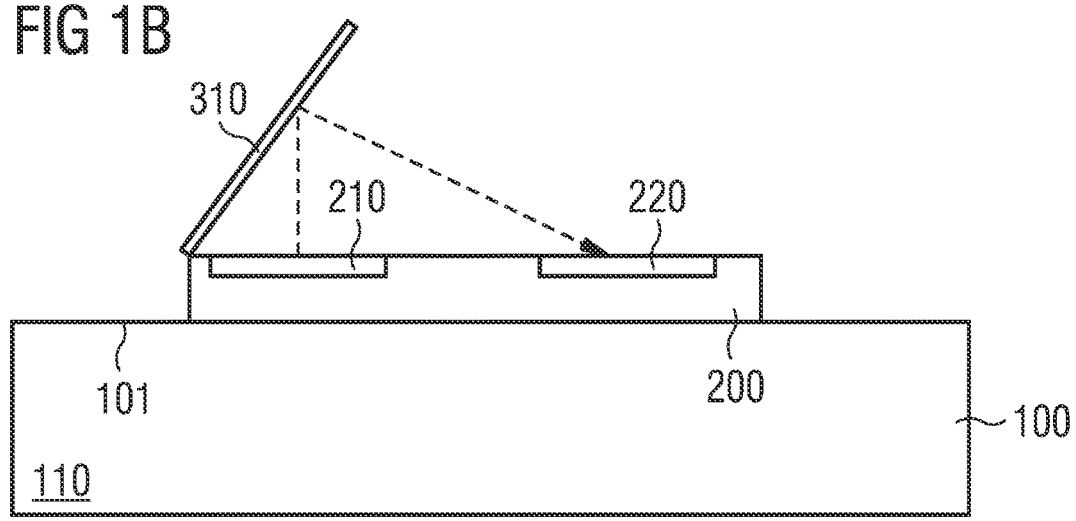

FIG. 1B shows a second embodiment having a single barrier. In this case the barrier 310 is arranged close to the transmitting element 210. The barrier 310 is tilted, i.e. with respect to a direction parallel to the main surface 101 of the integrated circuit 100. A tilting angle is arranged such that an ultrasound wave emitted by the transmitting element is emitted towards the barrier 310 first. At the barrier 310 the ultrasound wave gets reflected towards the receiving element 220 due to the tilting angle. In an alternative embodiment (not shown) the barrier 310 is arranged close to the receiving element 220. The tilting angle is arranged such that an ultrasound wave emitted by the transmitting element 210 may strike the receiving element 220 after getting reflected at the barrier 310. The tilted barrier may be implemented as sidewalls 312 of the chip package 300.

Figure 1C:
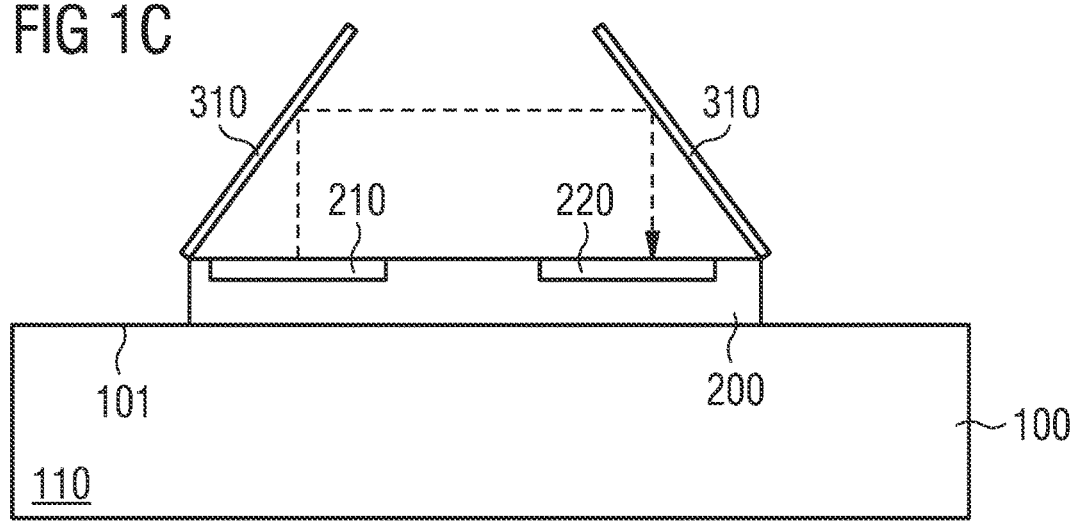

FIG. 1C shows a third embodiment having two barriers. In this case one barrier 310 is arranged close to the transmitting element 210 and another barrier 310 is arranged close to the receiving element 220. Both barriers 310 are tilted with respect to a direction parallel to the main surface 101 of the integrated circuit 100. The tilting angles are arranged such that an ultrasound wave emitted by the transmitting element 210 is reflected by both barriers 310 and directed towards the receiving element 220. The tilted barriers 310 may be implemented as sidewalls 312 of the chip package 300.

Figure 1D:
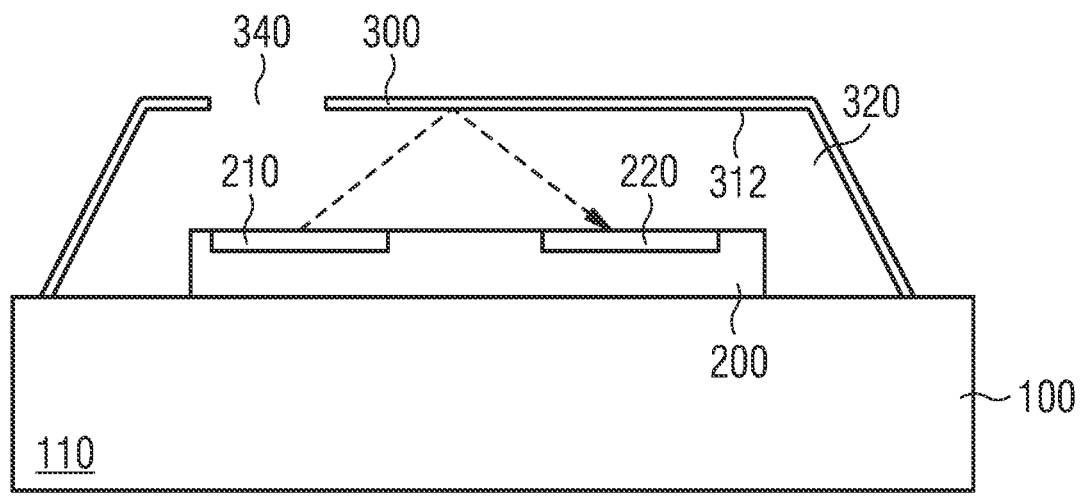

FIG. 1D shows a fourth embodiment. The drawing shows a schematic of a chip package 300. For example, the chip package 300 can be implemented as a Land Grid Array (LGA), a Pin Grid Array (PGA), and a Chip Scale Package (CSP) etc. In this embodiment the walls 312 of the chip package 300 serve as reflecting barriers 310, i.e. the chip package 300 is arranged such that an ultrasound wave emitted by the transmitting element 210 is reflected by the walls 312 of the chip package 300 and directed towards the receiving element 220. The chip package 300 forms a cavity 320 which encloses the ultrasonic transceiver 200. Additionally, the chip package 300 may be closed or open to ambient, e.g. comprises a hole to let gas or air inside the cavity 320. The chip package 300 can be considered an application of the principles discussed above, i.e. all considerations on dimensions, distances, tilting angles, materials and/or thermal properties can be applied in an analogous manner.

Figure 1E:
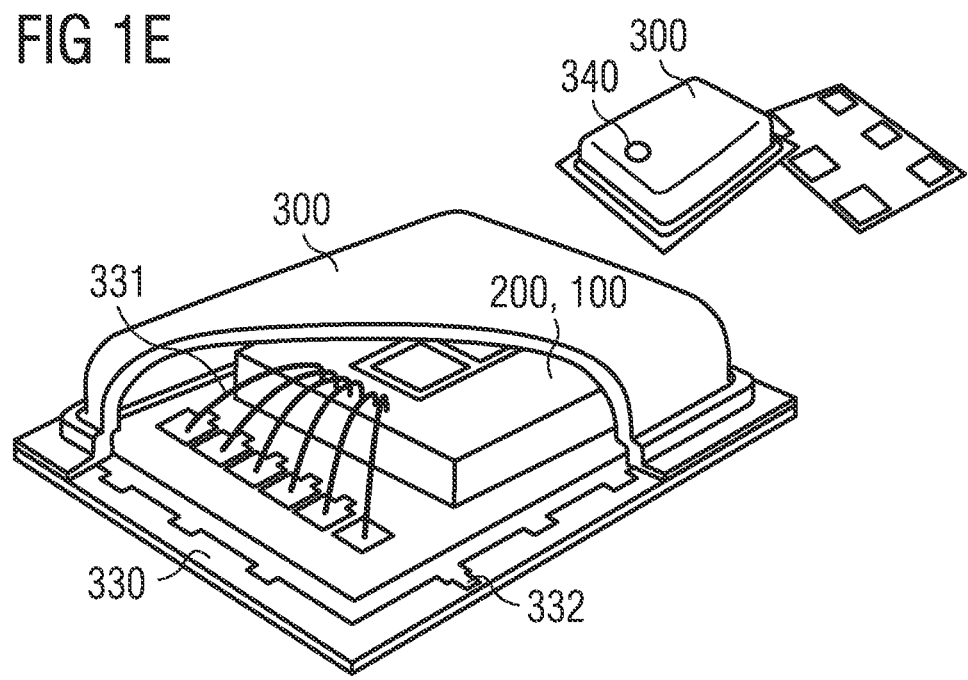

FIG. 1E shows a fifth embodiment. The drawing shows an isometric drawing of an exemplary Land Grid Array (LGA) chip package. An integrated temperature sensor is mounted on a laminate board 330 and electrically connected by means of wires 331, e.g. gold wires. The laminate board 330 is shielded by means of plated shield track and bond fingers which are arranged as a frame 332 around a border of the laminate board 330. The integrated temperature sensor is mounted on top of the laminate board 330 and is enclosed by the chip package 300 which is glued or laminated to the laminate board 330, e.g. by Epoxy. The chip package 300 can be implemented by metal, e.g. as metal lids. An inner surface or wall 312 of the package 300, facing the temperature sensor, serves as reflecting surface or barrier 310. The distance between the membrane surface and the metal lid is typically 200 μm. A hole 340 is arranged into the chip package 300 as indicated on the upper right part of the drawing to let the air inside the package 300.

FIG. 2 shows an exemplary embodiment of the integrated circuit. The drawing shows a schematic representation of components which in some or all embodiments could be embedded in the integrated circuit 100. The components embedded in the integrated circuit at least comprise an actuator element 120 to actuate the transmitting element to emit ultrasound waves and the converter element 130 to convert ultrasound waves. The integrated circuit 100 may have additional components such as additional sensors, a digital signal processor, terminals, ADCs, etc.

The actuator element 120 to actuate the transmitting element 210 comprise a signal source 121 and a power amplifier 122, for example. The signal source 121 provides a first signal s(t), e.g. a periodic signal having an amplitude a and a frequency f. The signal source 121 provides frequencies for emitting ultrasound waves ranging from 10 kHz up to several GHz, for example. This can either be achieved directly by means of a local oscillator or by appropriate means for up conversion such as frequency mixers. The signal source 121 is connected to the transmitting element 210 via the power amplifier 122. Furthermore, the signal source 121 is connected to a control unit 140 which may also be integrated into the same integrated circuit 100. The control unit 140 can be interfaced by an external computing unit via a terminal, for example. The control unit 140 may be a microcontroller, a signal processor, etc.

The converter element 130 to convert an ultrasound wave is connected to the receiving element 220 and comprise a preamplifier 131 and/or gain-controlled amplifier 132. These components are connected to the same (or another) control unit 140. For example, this control unit 140 also is a microcontroller and/or signal processor.

Additionally, the integrated circuit 100 may have means 150 to determine a time or phase delay from the emitted and received signals, such as a frequency detector 151 and a phase meter 152. The frequency detector 151 and phase meter 152 are connected to the preamplifier 131 and/or gain-controlled amplifier 132.

Furthermore, a relative humidity sensor 160 may be provided to correct for humidity effects on a measured speed of sound. The humidity sensor 160 can be integrated on the same integrated 100 and can be placed for example in-between the two membranes 210, 220 in FIGS. 1A to 1E. Furthermore, an auxiliary temperature sensor 170, e.g. a diode/transistor sensor, can be placed inside the integrated circuit 100 in order to measure a temperature of the integrated circuit 100. The auxiliary temperature sensor 170 can be used for further improving the accuracy of the sensor and/or calibration of the sensor as will be discussed in further detail with respect to FIG. 6.

Furthermore, a pressure sensor 180 can also be integrated into the integrated circuit 100. Preferably, the ultrasonic transceiver is implemented with membranes. One or both of these membranes can be reused as pressure sensor 180. The transmitting membrane 210 might be more appropriate since the receiving membrane 220 might need special design to be more sensitive to ultrasound. The integrated circuit 100 can have additional means to read-out a pressure signal from one or both membranes. It is possible, however, to use the control unit 140 discussed above for this purpose. For example, the microcontroller or signal processor can be arranged to process pressure information as well.

In operation the signal source 121 generates the first signal s(t). This signal is amplified by the power amplifier 122 and coupled into the ultrasonic transceiver 200. In turn, the transmitting element 210 emits ultrasound waves according to the first signal, e.g. continuous or pulsed. As discussed with respect to FIGS. 1A to 1E the emitted ultrasound waves are reflected at the barriers 310 and directed towards the receiving element 220. The receiving element 220 converts the reflected ultrasound waves into a second signal y(t). The second signal is fed into the preamplifier 131 and/or gain-controlled amplifier 132 and amplified.

The first and second signals s(t) and y(t) are used to determine a time delay which is caused by the ultrasound waves travelling from the transmitting element 210 to the receiving element 220. This measurement allows to deduce the speed of sound within the chip package 300 of the integrated temperature sensor. The following discussion derives a methodology which allows to determine the absolute temperature T from the speed of sound using the proposed integrated temperature sensor. In general, the integrated temperature sensor, and the integrated circuit, for example, may provide all necessary components to execute the methodology on board. This is to say that the integrated circuit comprises a computation unit, such as a microcontroller or signal processor, to perform the necessary computation steps. However, the integrated temperature sensor could also only provide for a preprocessing and provide the first and second signals to an external computation unit, such as a PC 185 or processor 186 in a mobile phone.

Figure 3:
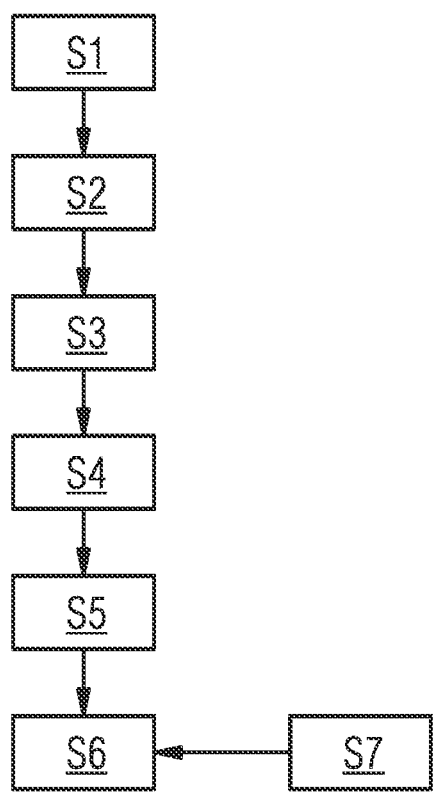
FIG. 3 shows a flowchart of an exemplary embodiment of a method for determining a temperature by means of an integrated temperature sensor.

FIG. 3 shows a flowchart of an exemplary embodiment of a method for determining a temperature by means of an integrated temperature sensor. The method discussed below relies on the fact that the speed of sound in any object is a function of temperature. For example, in an ideal gas the speed of sound is directly proportional to the square root of the absolute temperature T. Thus, the speed of sound provides a measure of absolute temperature.

In ideal gases the speed of sound c is affected by temperature T, pressure p, relative humidity RH % and the constitution of the gas. Assuming dry air at ambient pressure, the speed of sound c in air can be approximated by the ideal gas law and yields:

$$c = \sqrt{\frac{1.4 \cdot RT}{M}}$$

wherein R denotes the universal gas constant and M the mean molecular weight of air. Relative humidity RH % also has an impact on the speed of sound and needs to be accounted for. The impact of relative humidity will be discussed below. In the following, however, humidity is neglected as a first order of approximation.

A first step s1 in determining the speed of sound in the proposed integrated temperature sensors involves emitting an ultrasound wave is a function of a first signal s(t) (step s1). The ultrasound wave is emitted by the ultrasonic transceiver 200, e.g. by means of the transmitting element 210. At least a part of the emitted ultrasound wave is reflected by one or more barriers 310 in the chip package 300. Thus, in a next step s2 the reflected ultrasound wave is received by the ultrasonic transceiver, e.g. by means of the receiving element 220. The received ultrasound is than a converted into a second signal y(t) in a step s3. The speed of sound can be determined from these two signals, i.e. s(t) and y(t).

The emitted ultrasound wave travels through the chip package 300 and eventually gets reflected at the one or more barriers. This leads to a certain amount of attenuation. The defined positions of the barrier 310 (or barriers) with respect to the chip package define a path length L, which is the path the ultrasound wave has travelled once it gets received. Thus, the second signal y(t) can be assumed to be a delayed and attenuated version of the first signal s(t). In this approximation the second signal y(t) can be expressed as $$y(t)=a \cdot s(t-\Delta t),$$

where a is an attenuation factor and $\Delta t$ is a time delay. The time delay $\Delta t$ can be calculated (step s4) as the travel time of the emitted ultrasound wave from the transmitting element to the receiving element. For example, a time of emission $t_1$ and a time of receiving $t_2$ can be determined and the time delay $\Delta t$ can simply be calculated as $\Delta t = t_2 - t_1$. The speed of sound c can then be expressed as $$c = \frac{L}{\Delta t}$$

assuming a defined, i.e. fixed, path length L (step s5). In other words, the speed of sound can be determined from both the predetermined path length L and the determined signal delay $\Delta t$. Finally, a measure of the absolute temperature T can be determined from a speed of sound relation as discussed above (step s6). For example, ideal gases or real gases are widely explored and typically functional expressions relating the speed of sound and temperature are known.

Furthermore, additional parameters such as relative humidity can be accounted for. An additional humidity measurement can be used to remove the effect of humidity on the speed of sound measurement (step s7). For example, in the range of 0° C. to 100° C. the functional expression relating the speed of sound and temperature can be approximated by a linear function. The slope of this linear function depends on the relative humidity. Thus, the absolute temperate can be determined from the additional humidity measurement and from the determined speed of sound. For example, a humidity sensor can be integrated into the same integrated circuit as the ultrasonic transceiver.

The time delay, or time of flight, of the emitted and received ultrasound wave can be measured in different ways. The integrated temperature sensors can be operated in at least two different modes of operation: continuous or pulsed operation. In general, the integrated temperature sensors can be operated in both these modes alternatively. However, additional adjustments may improve measurement accuracy in pulsed operation, for example.

In continuous operation, ultrasound waves are emitted for a certain time period but continuously within that time period. The time delay $\Delta t$ of received ultrasound waves is typically measured in the signal phase space. In fact, in the signal phase the time delay $\Delta t$ corresponds to a phase delay angle $\Delta \theta$ which can be expressed as $\Delta \theta = 2\pi \cdot f \cdot \Delta t$, wherein f represents a frequency of the ultrasound wave. In pulsed operation, ultrasound waves are emitted as short pulses (intermittent trains of pressure waves) and each pulse commonly consists of 2 or 3 sound cycles of the same frequency. For example, a series of pulses can be used, such as a binary frequency shift-keyed (BFSK) type. A piezoelectric crystal or MEMS membranes can be used as transmitting element.

Figure 4:
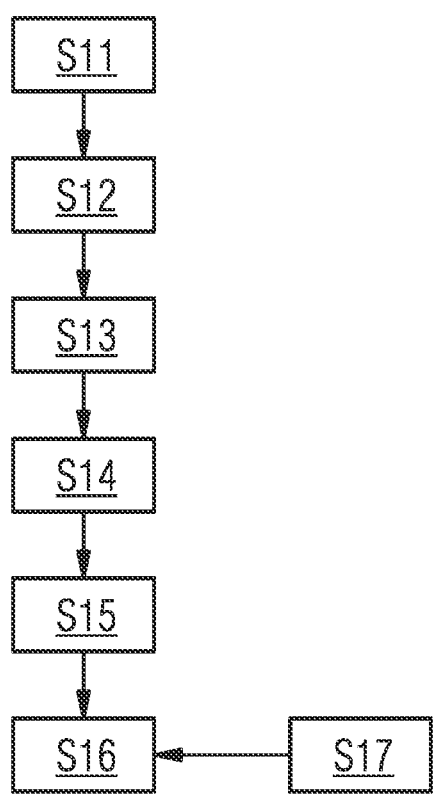
FIG. 4 shows a flowchart of an exemplary delay measurement in a continuous operation mode.

FIG. 4 shows a flowchart of an exemplary delay measurement in a continuous operation mode. The continuous mode is a preferred operation mode as it can be implemented in an easier fashion when compared to a pulsed operation mode, for example. Furthermore, the rather small dimensions of the chip package 300 allow for transceiving continuous, single frequency ultrasound waves without phase wrap in a large temperature range, as will be discussed in further detail below. In fact, continuously emitting ultrasound waves at a single frequency is often a simpler solution. The transduced or emitted ultrasound waves can be adjusted for the particular single frequency and a dedicated actuating circuit can be integrated into the integrated circuit.

In the continuous mode single frequency ultrasound waves are continuously emitted within a time period (step s11). The ultrasound waves in the continuous operation mode can be represented by the first signal s(t) written as a periodic single frequency f function:

$$s(t) = b \cdot \cos(2\pi \cdot f \cdot t + \theta + \Delta\theta),$$

wherein θ represents a phase and b is an amplitude. The received, i.e. reflected ultrasound wave can be expressed using the second signal y(t) and yields $$y(t) = a \cdot \cos(2\pi \cdot f \cdot t + \Delta\theta)$$

with Δθ being the phase delay angle expressed as $\Delta\theta = 2\pi \cdot f \cdot \Delta t$. Steps s12 and s13 correspond to steps s2 and s3, respectively. However, in step s14 instead of a time delay the phase delay Δθ, i.e. time delay, or time of flight, expressed in phase space, is determined by means of signal processing integrated into the integrated circuit, such as a phase meter, or by means of an external signal processor, such as a microcontroller. The measured phase delay angle Δθ determines the speed of sound (step s15) and, thus, can be used in the same way as discussed above to estimate the absolute temperature (s16). Again, an additional humidity measurement can be used to remove the effect of humidity on the speed of sound measurement (step s17).

Figure 5:
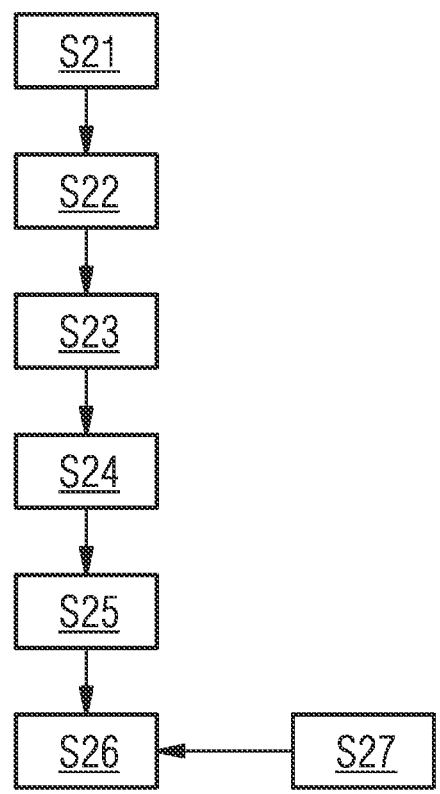
FIG. 5 shows a flowchart of an exemplary delay measurement in a pulsed operation mode.

FIG. 5 shows a flowchart of an exemplary delay measurement in a pulsed operation mode. In a first step s21 an ultrasound pulse is emitted towards the barrier 310 by means of the ultrasonic transceiver 200. The pulse may comprise just a single pulsed ultrasound wave or ultrasound wave are emitted as a number of short pulses such as intermittent trains of pressure waves, and each pulse commonly consists of 2 or 3 sound cycles of the same frequency. The first signal s(t) could be represented by one or more rectangle functions or a Fourier transform thereof. The ultrasonic transceiver comprises a piezoelectric crystal or MEMS membrane as the transmitting element, for example.

In steps s22 and s23 the ultrasound pulse is received and converted into the second signal y(t). The time delay due to travelling the path length L can then be determined (step 24). This can be done by using the frequency detector 151, for example. Then, the determined time delay is used to determine the speed of sound, and, finally, the temperature as discussed above (steps s25, s26). Again, an additional humidity measurement can be used to remove the effect of humidity on the speed of sound measurement (step s27).

Figure 6:
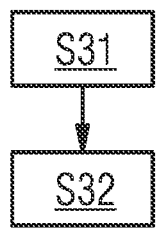
FIG. 6 shows a flowchart of an exemplary method to extend a measurement range with an auxiliary temperature sensor.

FIG. 6 shows a flowchart of an exemplary method to extend a measurement range with an auxiliary temperature sensor. The auxiliary temperature sensor can be integrated into the same integrated circuit as shown in FIG. 2.

One practical problem faced in phase measurements, such as the continuous operation mode introduced above in FIG. 4, lies in the ambiguity as soon as the phase extends over the 0 to 2π range. This effect will be denoted "phase wrap" or "phase wrap-around" hereinafter, since the continuous first and second signals are periodical and the angle θ can only be measured in the 0 to 2π interval. Large time delay changes Δt will cause the phase θ to leave the interval bounds and result in ambiguous measurements.

To solve this problem signals with multiple frequencies could be used but such a solutions makes both the sensor and signal processing considerably more complex to design. It can be shown, however, that for the proposed integrated temperature design, the geometrical dimensions can be arranged such that unambiguous measurements can be performed for a wide temperature range using just a single frequency for transceived ultrasound waves.

Let $c_{min}$ be a minimum and $c_{max}$ be a maximum speed of sound. The values of $c_{min}$ and $c_{max}$ correspond to a lowest temperature $T_{min}$ and a highest temperature $T_{max}$ to be measured, respectively. In order to avoid a phase wrap any phase change needs to stay within the boundaries of 0 to 2π. This can be expressed as:

$$f \cdot L \left( \frac{1}{c_{min}} - \frac{1}{c_{max}} \right) < 1.$$

This can be rewritten as the following boundary condition:

$$\frac{L}{\lambda_{max}} \cdot \frac{c_{max} - c_{min}}{c_{min}} < 1,$$

where $\lambda_{max}$ denotes the wavelength that follows from the wave relationship $\lambda_{max} = c_{max}/f$ corresponding to the maximum sound speed $c_{max}$. For example, for a signal frequency f=200 kHz follows $\lambda_{max} \approx 1.7$ mm, and for f=800 kHz follows $\lambda_{max} \approx 0.4$ mm.

The boundary condition depends on two factors. The first factor is determined as by a ratio between path length L, i.e. the distance between the transmitting and receiving elements in the ultrasonic transducer, and the maximum wavelength $\lambda_{max}$. The second factor is determined by a maximum relative change of the speed of sound that is of interest.

For a typical operating range of temperatures from −20° C. to 70° C. and a relative humidity from 0% to 100%, the maximum relative change of the speed of sound becomes 20%. Thus, as result for this given range, a design with path length of $L < 5 \cdot \lambda_{max}$ will not cause ambiguous measurements due to phase wrap. For a larger temperature range from −40° C. to 100° C. the maximum change becomes 30% and approximate requirement for unambiguous measurements becomes $L < 3 \cdot \lambda_{max}$. Typical dimensions for chip packages for the integrated temperature sensors are ranging from 1 to 3 mm in lateral dimension and around 1 mm in height or thickness. The miniaturised design proposed here allows for the path lengths that enable the use of single frequency phase measurements and, at the same time, avoid phase wrap.

As mentioned above, however, an integrated auxiliary temperature sensor typically does not provide for an accurate temperature measurement, e.g. when mounted on a printed circuit board (PCB) inside a mobile device such as a mobile phone. However, if implemented into the same integrated circuit, such a measurement from the auxiliary temperature sensor 170 can be used to extend the range of the ultrasound single frequency phase measurement without the need of a calibration.

For example, assume the integrated temperature sensor is designed to accurately cover an ultrasound measurement equivalent to a temperature range −T to +T. Then ranges from T to 3·T, or from −3·T to −T, etc., will not be distinguishable since they will all generate the phase delay in the same interval of phases Δθ=0, . . . , 2π. As discussed above such phase wrap leads to ambiguity in the temperature measurements. However, the auxiliary temperature sensor 170 can be used to disambiguate those extended ranges.

Assume that the auxiliary temperature sensor 170 has an accuracy of at least ±T. Further, let Δθ$_{phase}$ be an ambiguous ultrasound phase measurement and T$_{phase}$ be the corresponding calculated but ambiguous temperature. Let T$_{aux}$ be the additional sensor reading from the auxiliary temperature sensor 170 (step s31). Then if the T$_{phase}$ needs to be corrected by 2·T increments (step s32), defined by the accuracy ±T of the auxiliary temperature sensor, such that it fulfils:

$$(T_{phase}+2 \cdot n \cdot T)-T<T_{aux}<(T_{phase}+2 \cdot n \cdot T)+T.$$

The temperature range of the integrated temperature sensor can thus be extended and gives valid readings over a range of (T$_{phase}$+2·n·T), where n is an integer number chosen to fulfil the inequality above. This approach has the additional advantage that no additional calibration is needed in order to extend the temperature range.

Figure 7:
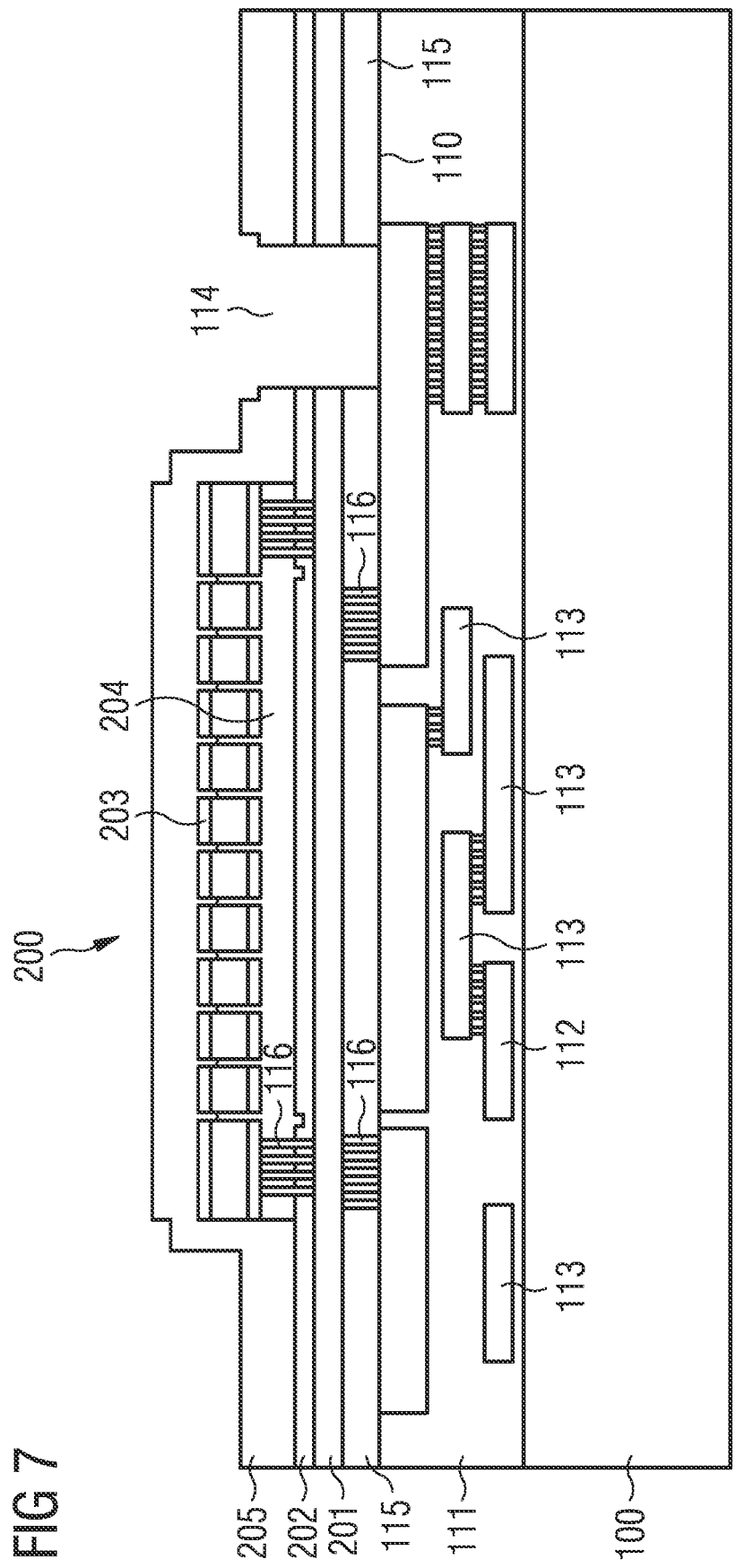
FIG. 7 shows an exemplary embodiment of an ultrasonic transceiver integrated on top of an integrated circuit.

FIG. 7 shows an exemplary embodiment of an ultrasonic transceiver integrated on top of an integrated circuit. For example, the drawing depicts a cross-section of a CMOS integrated circuit 100 having the ultrasonic transceiver 200.

The ultrasonic transceiver 200 is formed over a main surface 110 of the CMOS integrated circuit 100. In this embodiment this CMOS integrated circuit 100 comprises a fully processed wafer. A CMOS back end 111 is provided on the integrated circuit 100 and comprises a top metal layer 112. The top metal layer 112 comprises one or more shielding plates 113. The shielding plates 113 are distributed in the CMOS back-end 111 and add parasitic capacitances. Furthermore, one or more bonding pads 114 are arranged in the CMOS back-end 111 to provide electrical contact to the integrated circuit 100. A passivation layer 115 is arranged on the main surface 110 but leaves open an access to the bond pads. The top metal layer 115 of the CMOS back-end 111 not only is used as a shielding plate 113 for the overlying ultrasonic transceiver 200 but also enables formation of interconnects, e.g. to the bond pads. For example, the bond pads can be used as input and output to the integrated circuit 100.

The integrated circuit 100 and/or CMOS back-end 111 further may have additional components (not shown) such as means for transmitting and receiving ultrasound waves 210, 220 as discussed above with respect to FIG. 2, for example. Furthermore, additional sensors such as a humidity sensor 160, an auxiliary temperature sensor 170, pressure sensor etc. can be integrated as well. Thus, forming the integrated temperature sensor on top of the integrated circuit 100 results in a fully integrated solution.

The ultrasonic transceiver 200 comprises a planar, thin bottom electrode 201 which, in this embodiment, comprises an aluminum layer. The bottom electrode 201 is connected to the top metal layer 112 by means of interconnect vias 116 (such as Tungsten (W) filled vias, so called W-vias) extending through the passivation layer 115. The bottom electrode 201 is covered with a dielectric etch stop layer 202. The dielectric etch stop layer 202 has a dual function to stop etch during processing and provide isolation with no charging.

A top electrode 203 of the ultrasonic transceiver 200 is spaced apart from the bottom electrode 201. The top electrode 203 can be made from titanium-tungsten, titanium, titanium nitride, aluminum, SiGe and/or a combination of the above mentioned materials. The high tensile film stress determines to flexion properties and profile of the top electrode 203. Together the top and bottom electrodes 201, 202 enclose a cavity 204 for low and stable pressure with no outgassing. The cavity 204 has a gap height which can be controlled during processing of the integrated temperature sensor, for example by means of sacrificial etching. The top and bottom electrodes 201, 203 are electrically connected by means of interconnecting vias 116 (such as W-vias). Finally, a sealing layer 205 is deposited over the top electrode 203 and parts of the dielectric etch stop layer 202 leaving open the access to the bond pads 114. Thickness and hermeticity of the sealing layer 205 define a high temperature seal.

The embodiment shown in FIG. 7 basically provides a single membrane setup. The concept can be extended to a dual membrane design in a similar structure. In such a setup a set of two top and bottom electrodes 201, 203 can be implemented side-by-side. Electrical connections and further layers presented above can be provided in an analogous way as discussed above.

Figure 8:
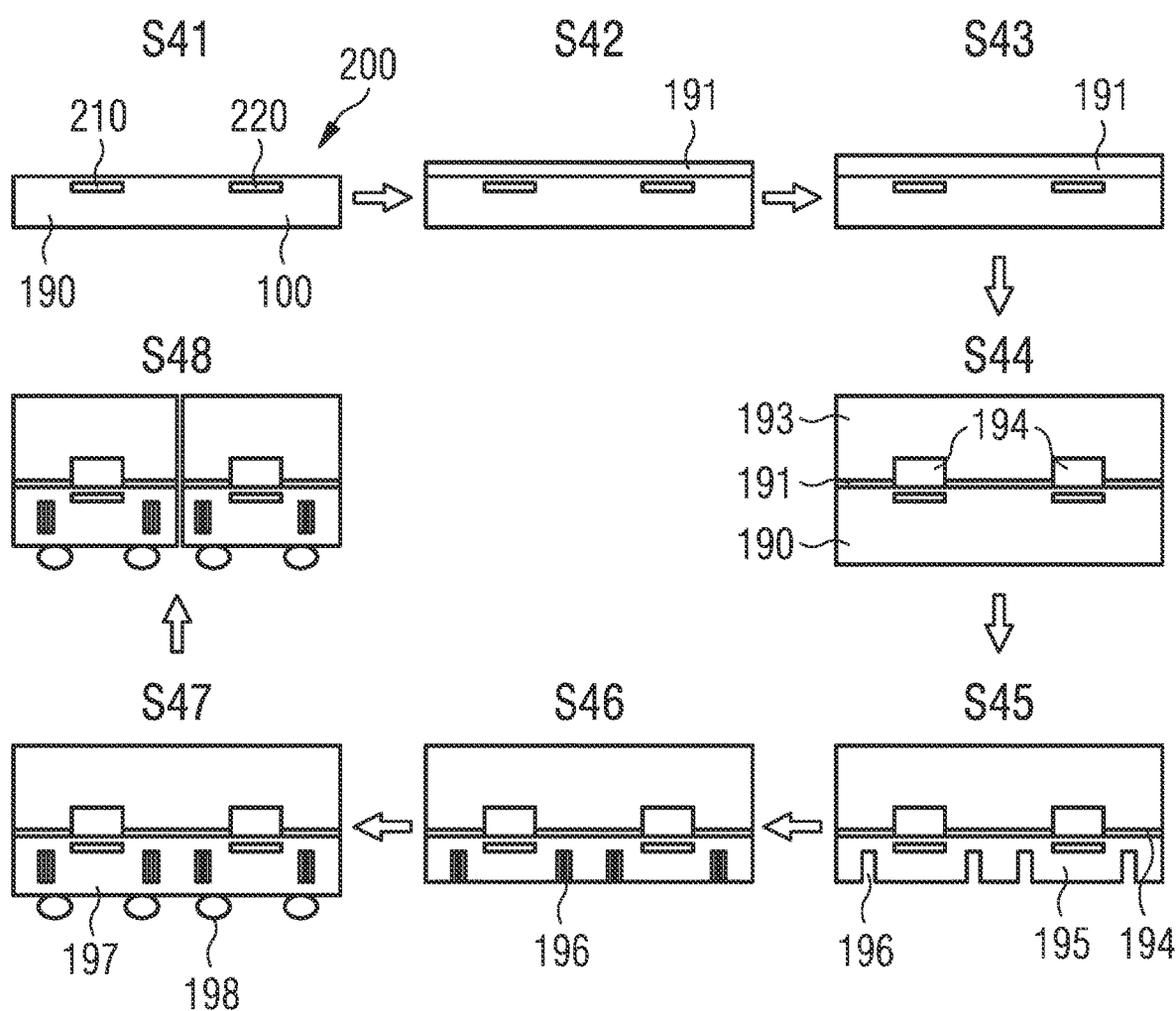
FIG. 8 shows an exemplary process flow of a method for producing an integrated temperature sensor, FIG. 9 show another exemplary embodiment of an integrated temperature sensor.

FIG. 8 shows an exemplary process flow of a method for producing an integrated temperature sensor. The concept of an ultrasonic transceiver 200 integrated on top of an integrated circuit 100 can be used to make also a chip package 300 with comparably small form factor, footprint and height. The drawing summarizes a process flow using a three dimensional Wafer-Level Chip-Scale Package (3D-WLCSP) as one exemplary way to producing the integrated temperature sensor. This process preferably is performed at wafer-level, i.e. a plurality of integrated temperature sensors are fabricated at the same time.

In a first step s41 a wafer 190 is provided having a plurality of integrated circuits 100 (denoted IC wafer 190 hereinafter). The IC wafer 190 comprises silicon, for example. The IC wafer 190 is already fully processed and the integrated circuits 100 may have integrated means for processing and/or additional sensors as discussed above. Furthermore, ultrasonic transceivers 200 are already fully processed and integrated on top of the integrated circuits 100, respectively.

In a second step s42 a glue layer 191 is deposited on the IC wafer 190, i.e. on top of the integrated circuits 100 and the ultrasonic transceivers 200. For example, the glue layer 191 comprises a photosensitive polymer of about ±25 μm thickness. Polyimide as polymer compound can withstand significant temperatures during processing, for example.

In a third step s43 the glue layer 191 is patterned. For example using an extra mask the glue layer 191 is removed from the membrane area defined by the top electrodes 203 of the ultrasonic transceivers 200. The process may use light to locally remove the photosensitive polymer. This way grooves or slits 192 can be provided in the glue layer 191 which later in the processing allow access to the ambient, e.g. after finally singulating the wafer 190 into single units of integrated temperature sensors. The grooves or slits 192 constitute air access holes. The access to ambient is made during a dicing step (see below).

In a fourth step s44 a prefabricated cap wafer 193 is positioned over the IC wafer. The cap wafer 193 comprises silicon, for example. The cap wafer 193 comprises a plurality of pre-etched holes 194. These holes have been etched into the cap wafer 193 using deep reactive-ion etching (DRIE), for example. Preferably, the holes 194 have a depth of about 300 μm or greater. The cap wafer 193 is positioned over the IC wafer 190 with the holes 194 aligned with respect to the top electrodes 203 of the ultrasonic transceivers 200. The cap wafer 193 is then glued or laminated to the glue layer 191 at a bonding temperature, e.g. 250° C.

A fifth step s45 involves application of a back grinding layer 195 over a backside of the IC wafer 190 (i.e. the backside faces away the CMOS back-end). For example, the back grinding layer 195 has a thickness of about 100 µm. Furthermore, using TSV processing one or more through substrate vias (TSV) 196 are etched into the grinding layer 195.

In a sixth step s46 the etched TSVs 196 are isolated and metallized. Electrical connectivity is provided in a seventh step s47 by applying a redistribution layer (RDL) 197 on the grinding layer 195 and bumping of one or more bumps 198 onto the RDL 198. Finally, in an eighth step s48 the IC wafer 190 and glued cap wafer 193 are singulated into individual temperature sensors. The singulated sensor may be additionally packaged using tape and reel (T&R) packaging.

Figure 9:
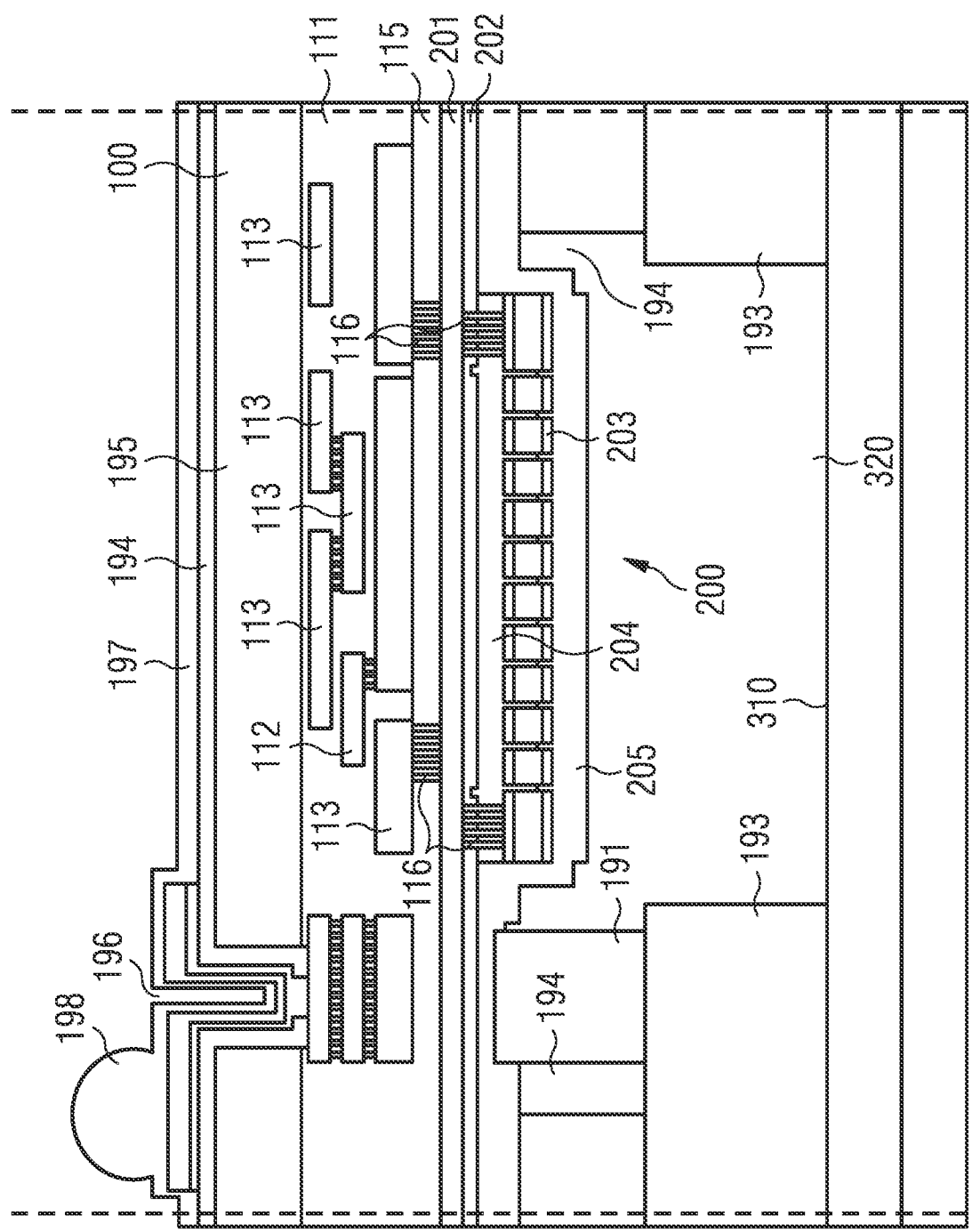

FIG. 9 shows another exemplary embodiment of an integrated temperature sensor. In fact, the drawing shows an integrated temperature sensor fabricated as a 3D-WLCSP chip package in a process according to FIG. 8. The integrated temperature sensor comprises the integrated circuit 100 and the ultrasonic transceiver 200 depicted in FIG. 7. The barrier 310 is constructed by means of the cap wafer 193 which is glued on top of the wafer 190. Thus, the cap 193 (e.g. made by silicon) serves as reflecting surface of the barrier 310. The sensor has a groove or slit 192 at the glue layer 191 to let the air inside. The distance between the top membrane 203 surface and the cap metal lid is typically 300 µm. Electrical connection to the integrated temperature sensor is established through one or more TSVs 196 which are also indicated in FIG. 9.

The method discussed in FIG. 8 and the temperature sensor shown in FIG. 9 have an open cavity 320, i.e. the volume between the top and bottom electrodes 201, 203 has access to ambient. If, however, the cavity 320 is closed, variations in relative humidity and pressure are cancelled out. The 3D-WLCSP packaging concept described in FIG. 8 allows to seal of the cavity 320 completely. For example, the cavity 320 can be sealed at ambient pressure with dry air during lamination of the cap wafer 193 with the IC wafer 190.

Figure 10A:
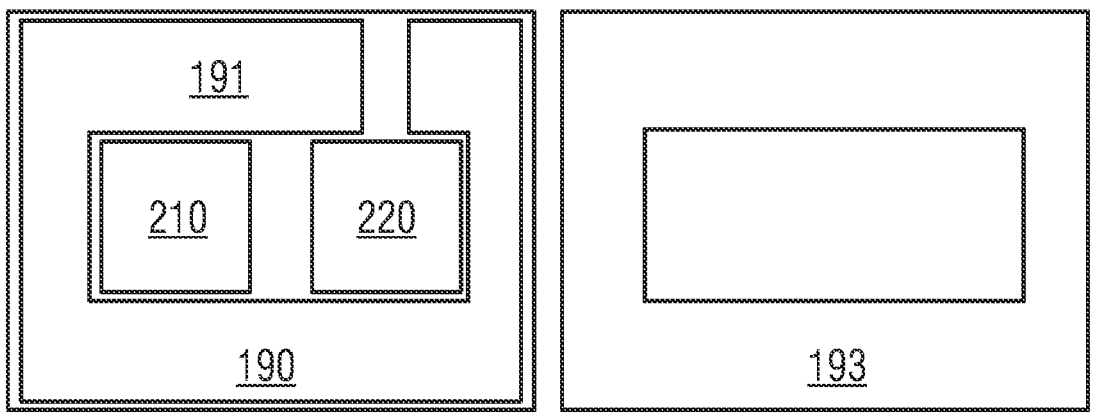
FIGS. 10A to 10C show exemplary membrane embodiments of an ultrasonic transceiver integrated on top of an integrated circuit.
Figure 10B:
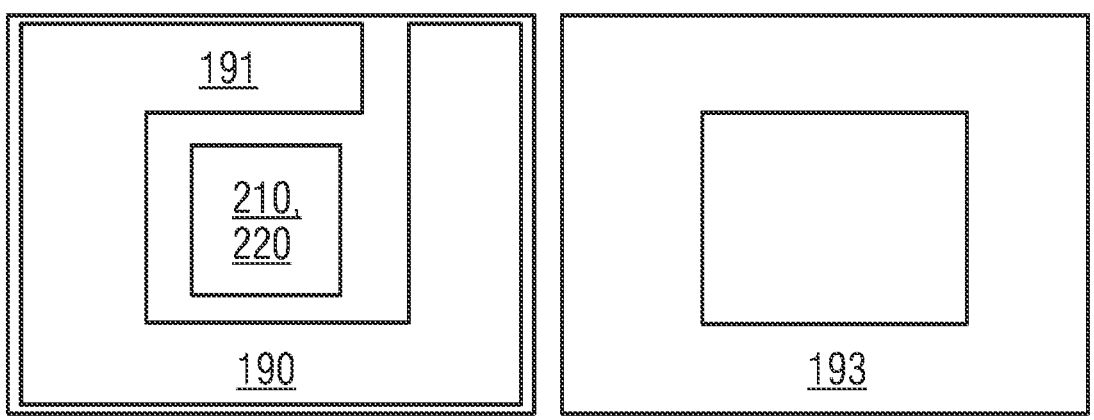
Figure 10C:
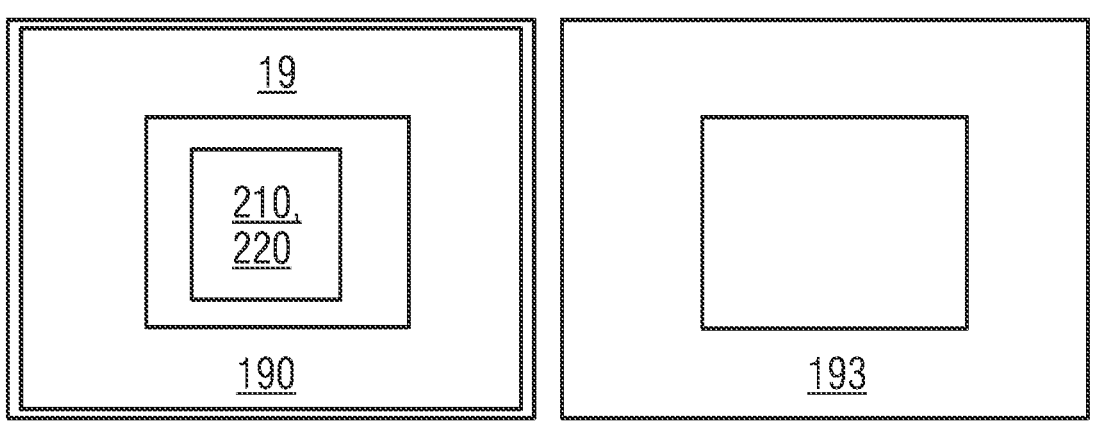

FIGS. 10A to 10C show exemplary membrane embodiments of an ultrasonic transceiver integrated on top of an integrated circuit. The transmitting and receiving elements 210, 220 are preferably implemented by membranes, such as MEMS membranes. Each membrane comprises a top and bottom electrode 201, 203 as introduced above. In general, the transmitting and receiving elements 210, 220 can be implemented by the same membrane or implemented as separate membranes.

If a single membrane is used as transmitting and receiving element 210, 220 it can be operated in both a send and receive mode. However, it can be shown that damping of the membrane after excitation should be sufficiently high to be able to operate the ultrasonic transceiver 200 in pulse echo mode. Otherwise the signals may overlap. An parameter to consider is the quality factor, which for the current design can be relatively high, e.g. >200. A high quality factor implies that damping is relatively low. This makes it more difficult to separate the send and receive pulse from each other and could require a long cavity length. Using a larger membrane helps to reduce the resonance frequency, and quality factor. Moreover, it reduces a DC bias voltage to pull the device into collapse. Another solution could be to have a two membrane configuration with one membrane operating in send mode and another in receive mode.

FIG. 10A shows an ultrasonic transceiver with a two membrane configuration and open cavity in top view. The drawing shows a top view of a singulated part of an IC wafer 190 on the left side and of a corresponding singulated part of a cap wafer 193 on the right side.

The IC wafer 190 has been arranged with the glue layer 191 which encircles a transmitting membrane 210 and a receiving membrane 220. An area 199 surrounding the membranes has no glue layer 193. In fact, there's no glue layer arranged between the transmitting and receiving membrane 210, 220. Furthermore, a profile slit 193 is arranged into the glue layer 193 to provide for access to the ambient. The cap wafer 192, on the other side, comprises a hole 194 with a depth of about 300 µm or greater. The hole has a surface area which is arranged to fit the transmitting and receiving membrane 210, 220 when the IC wafer 190 and cap wafer 193 are glued or laminated together. In such a two membrane configuration the transmitting membrane 210 is operating in send mode to emit ultrasound waves. The receiving membrane 220 is operating in receiving mode and receives reflected ultrasound waves.

FIG. 10B shows an ultrasonic transceiver 200 with a single membrane configuration and open cavity in top view. The drawing shows a top view of a singulated part of an IC wafer 190 on the left side and of a corresponding singulated part of a cap wafer 193 on the right side. In this alternative a standing wave can be established between the membrane 210, 220 and the barrier 310, e.g. a wall 312 of the chip package 300. Under this condition minute changes in wavelength due to temperature variations can be detected.

The appropriate standing wave condition can be determined experimentally. A standing wave ratio between emitted and reflected ultrasound waves can be measured using the following experimental setup. A piece of Plexiglas is fixed at a distance of D=1-2 cm, for example above and parallel to the IC wafer. The glass can be moved in z-direction using a micromanipulator, e.g. in steps of 25 µm. An impedance is measured using an impedance analyzer. A model has been developed that describes the electrical impedance of a membrane that transmits an acoustic wave. The acoustic wave is received again by the membrane after it has been reflected from a mirror like target positioned at a distance away from the membrane. A relation between the electrical impedance of the membrane and the acoustic impedance at the membrane-air interface was derived. From the model a relation can be obtained between the acoustic impedance and the spacing between the membrane and a reflector that is situated at a distance away from the membrane. Combining both gives a relation between the electrical impedance and the spacing between the membrane and the reflector, both of which can be easily measured experimentally.

FIG. 10C shows an ultrasonic transceiver with a single membrane configuration and closed cavity in top view. The drawing shows a top view of a singulated part of an IC wafer 190 on the left side and of a corresponding singulated part of a cap wafer 193 on the right side. The layout presented in the drawing corresponds to the one discussed in FIG. 10B. However, there's no groove or slit 192 providing access to the ambient, i.e. the cavity 320 is closed. In this configuration the effect of relative humidity and pressure are cancelled out. The packaging concept discussed above with respect to FIG. 8 allows to seal off the cavity 320 completely. The cavity 320 can be sealed at ambient pressure using dry air during lamination of the cap wafer 193 with the IC wafer 190.

A single membrane layout can also be used to implement a pulsed mode operation as discussed in FIG. 5. Pulsed operation can be used to transmit and detect the signal using a single membrane. However, for such operation the pulse needs to be very short.

Even though operating in pulsed mode is possible it will suffer from the fact that the quality factor is typically relatively high, e.g. >200, which implies that damping is relatively low. This makes it more demanding to separate a transmitting pulse and receive pulse from each other. This would require a long cavity length. Using a larger membrane helps to reduce resonance frequency and quality factor. Moreover, it reduces the DC bias voltage to pull the device into collapse. However, continuous mode using just a single frequency benefits from the high Q factor and needs less power to produce a signal.

The invention claimed is:

1. An integrated temperature sensor, comprising a chip package enclosing an integrated circuit and an ultrasonic transceiver integrated on top of the integrated circuit, wherein:
   the ultrasonic transceiver comprises a transmitting element for emitting ultrasound waves and a receiving element for receiving ultrasound waves,
   the chip package comprises at least one barrier arranged at a defined position in the chip package, wherein the barrier is designed to at least partly reflect ultrasound waves emitted by the transmitting element towards the receiving element,
   the integrated circuit comprises an actuator element to actuate the transmitting element to emit ultrasound waves according to a first signal, and a converter element to convert an ultrasound wave, received by the receiving element, into a second signal, and wherein
   the integrated circuit further comprises a detector to determine a time or phase delay from the emitted first signal and the received second signal.

2. The sensor according to claim 1, wherein the detector to determine a time or phase delay comprises a frequency detector and/or a phase meter coupled to the receiving element.

3. The sensor according to claim 1, wherein the actuator element to actuate the transmitting element comprise:
   a signal source arranged for generating the first signal, and
   a power amplifier connected to the signal source and the transmitting element, arranged for actuating the transmitting element to emit the first signal.

4. The sensor according to claim 1, wherein the converter element to convert an ultrasound wave comprise a preamplifier and/or gain-controlled amplifier coupled to the receiving element.

5. The sensor according to claim 1, wherein the transmitting element and/or receiving element are designed as membranes.

6. The sensor according to claim 5, wherein the transmitting element and the receiving element are designed as a single transmitting and/or receiving membrane, respectively or as separate dual transmitting, receiving membranes.

7. The sensor according to claim 1, wherein the transmitting element and the receiving element are arranged
   in the ultrasonic transceiver at a distance equal or close to $\lambda_{max}$ from each other, wherein $\lambda_{max}$ corresponds to a maximum speed of sound $c_{max}$ given an ultrasound frequency f and follows from the wave relationship and/or are arranged
   with a length or diameter equal to or within 10% of the maximum sound wavelength $\lambda_{max}$.

8. The sensor according to claim 1, wherein the chip package comprises one of: a Land Grid Array, a Pin Grid Array, a Chip Scale Package and/or a 3D Wafer Level Chip Scale Package.

9. The sensor according to claim 1, wherein the at least one barrier is arranged inside the chip package and/or is arranged as an integral part of the chip package.

10. The sensor according to claim 7, wherein the at least one barrier defines a path length L which corresponds to the path connecting the transmitting element and the receiving element by way of reflection via the one or more barriers, and wherein the path length is arranged to depend on the maximum sound wavelength $\lambda_{max}$.

11. The sensor according to claim 10, wherein a frequency f of the emitted ultrasound waves and the path length L are arranged to meet the following boundary condition:

$$\frac{L}{\lambda_{max}} \cdot \frac{c_{max} - c_{min}}{c_{min}} < 1,$$

where $c_{min}$ denotes a minimum and $c_{max}$ a maximum speed of sound, corresponding to a lowest temperature $T_{min}$ and a highest temperature $T_{max}$ to be measured, respectively, and $\lambda_{max}$ denotes the maximum wavelength.

12. The sensor according to claim 7, wherein the at least one barrier is located at a distance equal or close to the maximum sound wavelength $\lambda_{max}$ with respect to at least one surface of the chip package.

13. The sensor according to claim 1, wherein the chip package encloses a cavity, and wherein the cavity is closed or open to ambient.

14. The sensor according to claim 1, wherein the integrated circuit further comprises one or more of: a relative humidity sensor, a pressure sensor, and/or an auxiliary temperature sensor, integrated into the integrated circuit.

15. A method for producing an integrated temperature sensor, comprising
   providing an integrated circuit with an actuator element to actuate a transmitting element to emit ultrasound waves according to a first signal, and with a converter element to convert an ultrasound wave, received by a receiving element, into a second signal, and a detector to determine a time or phase delay from the emitted first signal and the received second signal,
   integrating an ultrasonic transceiver on top of the integrated circuit, wherein the ultrasonic transceiver comprises the transmitting element for emitting ultrasound waves and the receiving element for receiving ultrasound waves, and
   forming a chip package so as to at least partly enclose the integrated circuit and the ultrasonic transceiver, and
   arrange at least one barrier at a defined position in the chip package, wherein the barrier is designed to at least partly reflect ultrasound waves emitted by the transmitting element towards the receiving element.

16. The method according to claim 15, wherein
   a wafer is provided having a plurality of integrated circuits and a plurality of ultrasonic transceivers, respectively,
   a glue layer is deposited on the wafer on top of the integrated circuits and the ultrasonic transceivers
   the glue layer is patterned so that grooves are provided in the glue layer a prefabricated cap wafer is positioned over the wafer, wherein the cap wafer comprises a plurality of pre-etched holes, and wherein the holes are aligned with respect to the ultrasonic transceivers to form a plurality of cavities, the cap wafer is glued or laminated to the glue layer to form the chip package, a back grinding layer over a backside of the wafer one or more through substrate vias are etched into the grinding layer, isolated and metallized, electrical connectivity is provided to each integrated circuit by applying a redistribution layer on the grinding layer and bumping of one or more bumps onto the redistribution layer, and the wafer and cap wafer are singulated into individual integrated temperature sensors.

17. A method for determining a temperature by means of an integrated temperature sensor comprising a chip package having an integrated circuit and an ultrasonic transceiver integrated on top of the integrated circuit, the method comprising:

by means of the ultrasonic transceiver, emitting an ultrasound wave towards at least one barrier arranged at a defined position in the chip package, wherein the ultrasound wave depends on a first signal, by means of the ultrasonic transceiver, receiving an ultrasound wave reflected at the barrier, converting the received ultrasound wave into a second signal, determining a time delay from the first signal and the second signal, determining a speed of sound from the time delay, and determining a temperature from the determined speed of sound.

18. The method according to claim 17, wherein the integrated temperature sensor is operated in a continuous operation mode, wherein the ultrasonic transceiver continuously emits ultrasound waves within a time period and with a single frequency f, or in a pulsed operation mode, wherein the ultrasonic transceiver emits ultrasound waves as a pulse and/or a train of consecutive pulses.

19. The method according to claim 18, wherein the time delay of received ultrasound waves is measured as the phase delay in the signal phase space, and the frequency f and path length L are arranged to meet the following boundary condition:

$$\frac{L}{\lambda_{max}} \cdot \frac{c_{max} - c_{min}}{c_{min}} < 1,$$

where $c_{min}$ denotes a minimum and $c_{max}$ denotes a maximum speed of sound, corresponding to a lowest temperature $T_{min}$ and a highest temperature $T_{max}$ to be measured, respectively, and $\lambda_{max}$ denotes the wavelength that follows from the wave relationship $\lambda_{max} = c_{min}/f$ corresponding to the maximum sound speed $c_{max}$.

20. The method according to claim 17, further comprising:

determining an auxiliary temperature $T_{aux}$ from an auxiliary temperature sensor integrated in the integrated circuit, wherein ±T denotes an accuracy of the auxiliary temperature sensor, and correct the determined time delay, given by $\Delta\theta_{phase}$, and the determined temperature, given by $T_{phase}$, by 2·T increments such that the following inequality holds:

$(T_{phase} + 2 \cdot n \cdot T) - T < T_{aux} < (T_{phase} + 2 \cdot n \cdot T) + T,$ where n is an integer number chosen to fulfil the above inequality.

* * * * *